United States Patent [19]

Breed et al.

[11] Patent Number: 5,098,124

[45] Date of Patent: Mar. 24, 1992

[54] PADDING TO REDUCE INJURIES IN AUTOMOBILE ACCIDENTS

[75] Inventors: David S. Breed, Boonton Township, Morris County; Ferevdoon Shokoohi, Hackettstown, both of N.J.

[73] Assignee: Automotive Technologies International Inc., Denville, N.J.

[21] Appl. No.: 578,365

[22] Filed: Sep. 6, 1990

[51] Int. Cl.[5] .................... B60R 21/04; B60R 21/55
[52] U.S. Cl. ..................... 280/751; 280/739; 280/729; 267/91
[58] Field of Search ............... 280/751, 752, 739, 750, 280/753, 756, 729; 267/91, 146, 149, 148; 293/107, 110; 297/216, 487, 488

[56] References Cited

U.S. PATENT DOCUMENTS

| | | | |
|---|---|---|---|
| 1,331,359 | 2/1920 | Parrott et al. | 280/239 X |
| 2,854,230 | 9/1958 | Jones et al. | 267/149 |
| 3,120,381 | 2/1964 | Sweeney et al. | 267/149 |
| 3,486,767 | 12/1969 | Lujan | 280/751 X |
| 3,588,158 | 6/1971 | Ford et al. | 293/107 |
| 3,640,546 | 2/1972 | Brawn | 280/732 |
| 3,680,912 | 8/1972 | Matsuura | 297/391 |
| 3,815,887 | 6/1974 | Curtis et al. | 267/91 |
| 3,894,750 | 7/1975 | Eckels | 280/730 |
| 3,930,665 | 1/1976 | Ikawa | 280/751 |
| 3,989,275 | 11/1976 | Finch et al. | 280/751 |
| 4,154,472 | 5/1979 | Bryll | 297/216 X |
| 4,225,178 | 9/1980 | Takada | 297/216 |
| 4,272,103 | 6/1981 | Schmid et al. | 280/751 |
| 4,273,359 | 6/1981 | Scholz et al. | 280/751 |
| 4,721,329 | 1/1988 | Brantman et al. | 280/751 |
| 4,951,963 | 8/1990 | Behr et al. | 280/753 |

*Primary Examiner*—Kenneth R. Rice
*Assistant Examiner*—Kevin Hurley
*Attorney, Agent, or Firm*—Sprung Horn Kramer & Woods

[57] ABSTRACT

Padding for use on vehicle doors for protection of occupants in side impact accidents is composed of a plurality of cells. Each cell is filled with air and sealed except for an orifice. The flow of the air through the orifice provides the damping required to absorb the energy of the impacting occupant. Each cell contains a spring, usually in the form of foam rubber, to maintain the cell in its inflated shape. The plurality of cells provides for better control over the motion of the occupant. The padding can also be used on any surface of the passenger compartment including knee bolsters, headrests, A and B pillars, roofs structures, roof and seats.

19 Claims, 22 Drawing Sheets

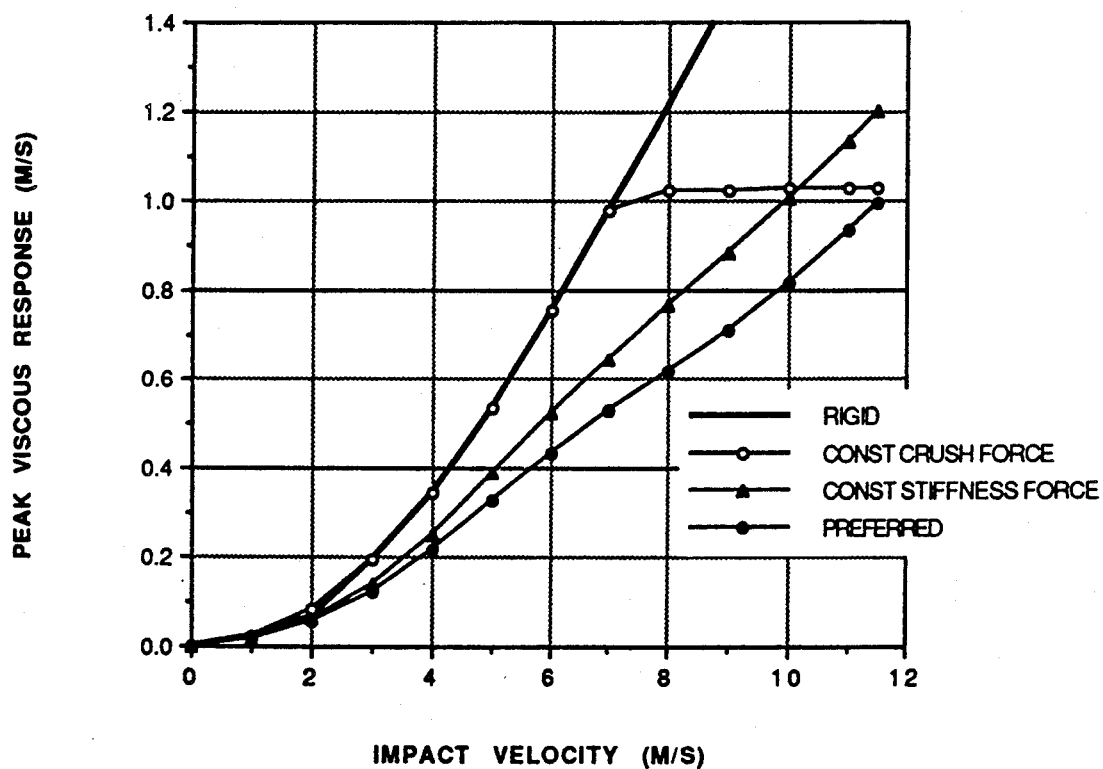
FIG. 4. PEAK VISCOUS RESPONSE FOR DIFFERENT PADDINGS OF 10 CM THICKNESS EACH OPTIMIZED FOR A 20 KG IMPACTOR STRIKING THE CHEST AT 11.5 M/S

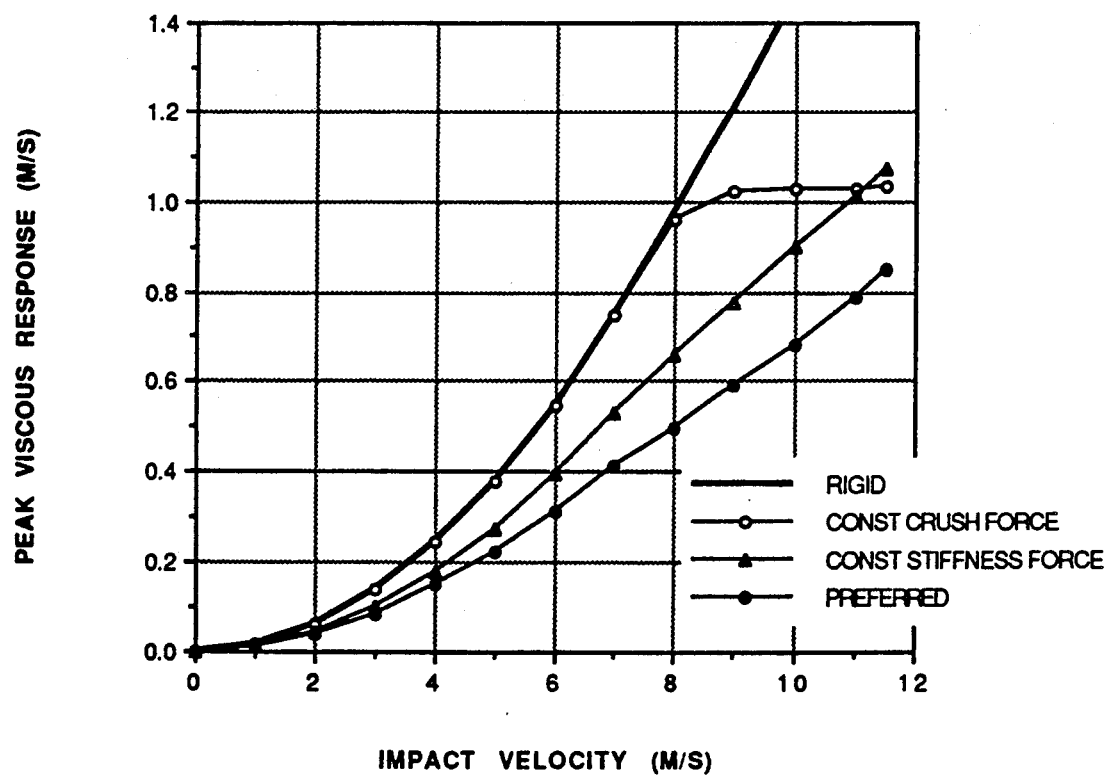
FIG. 4A. PEAK VISCOUS RESPONSE FOR OPTIMAL PADDINGS OF FIG. 4 FOR A 10 KG IMPACTOR STRIKING THE CHEST

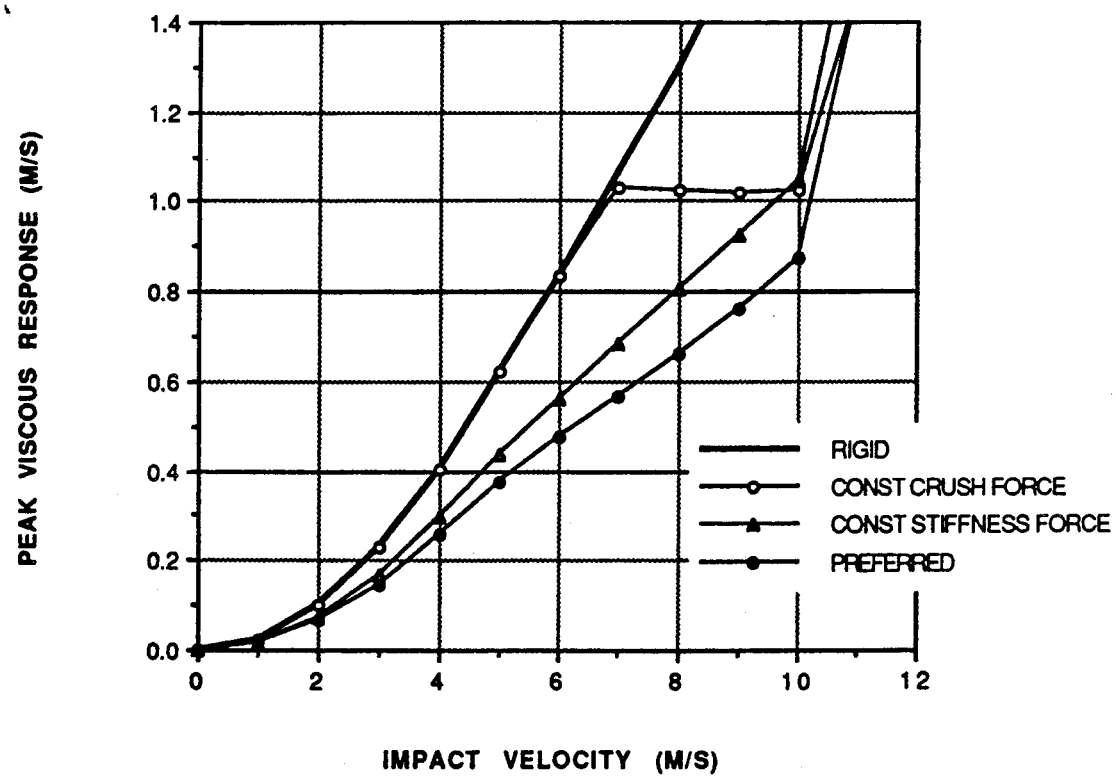
FIG. 4B. PEAK VISCOUS RESPONSE FOR OPTIMAL PADDING OF FIG. 4 FOR A 30 KG IMPACTOR STRIKING THE CHEST

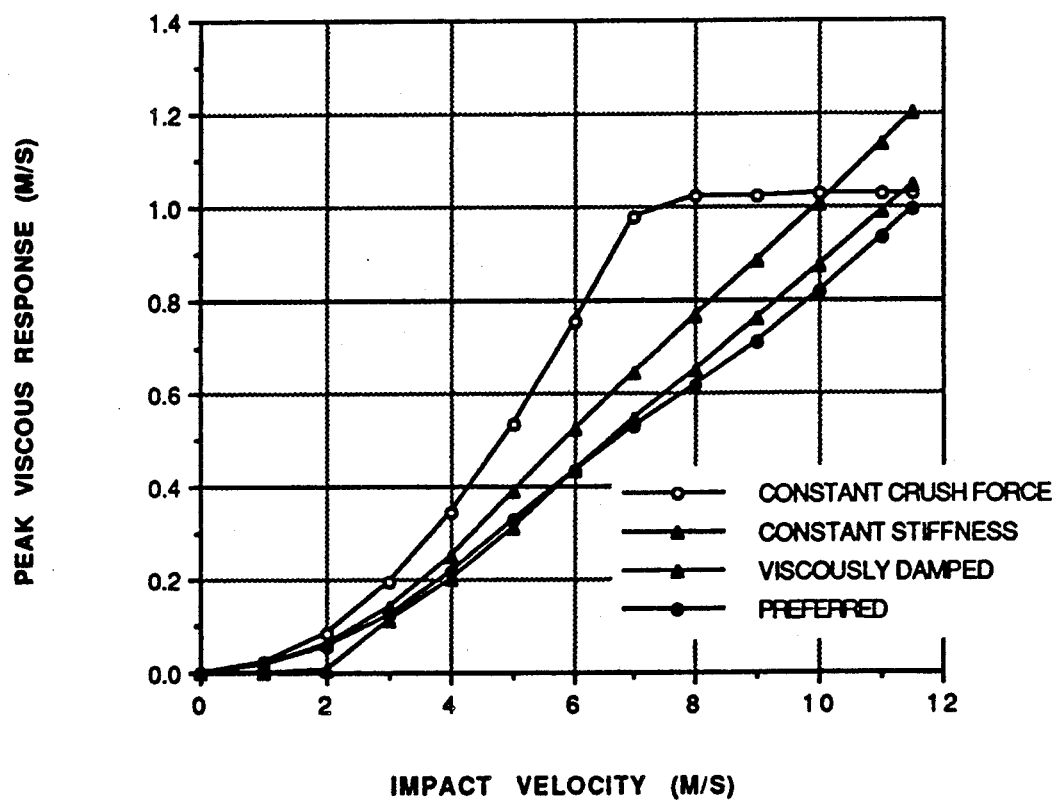
FIG. 4C. COMPARISON OF A VISCOUSLY DAMPED PADDING WITH OTHER TYPES OF PADDING. EACH PADDING IS OPTIMIZED FOR A 20 KG IMPACTOR STRIKING THE CHEST AT 11.5 M/S

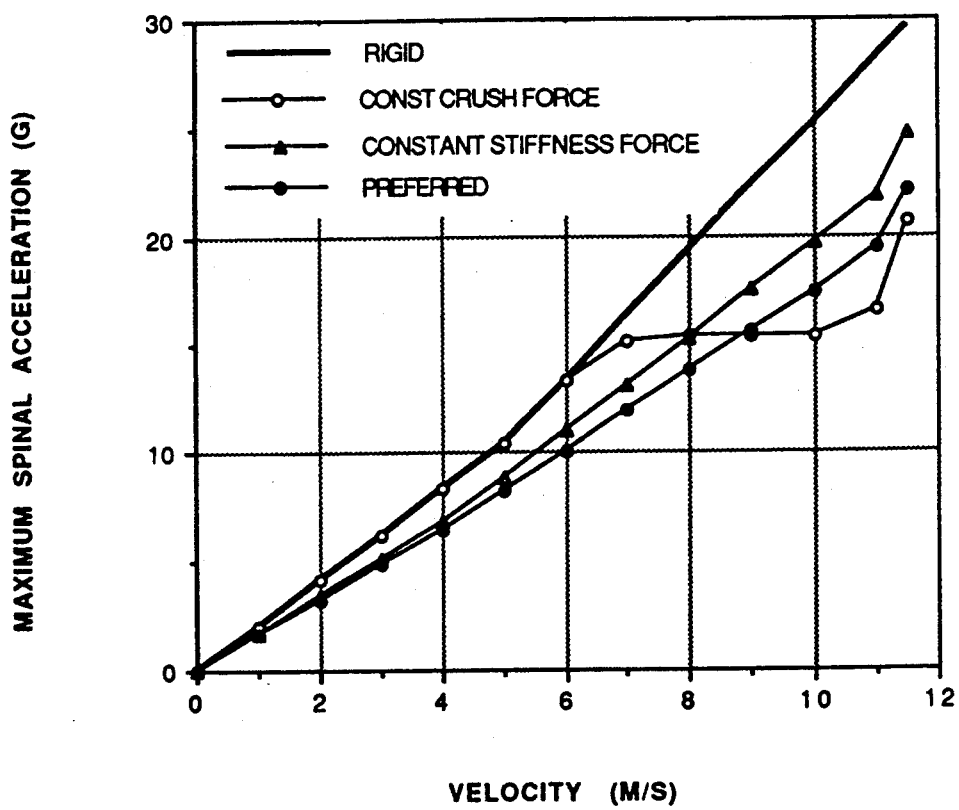
FIG. 5. MAXIMUM SPINAL ACCELERATION FOR DIFFERENT PADDINGS OF 10 CM THICKNESS EACH OPTIMIZED FOR A 20 KG IMPACTOR STRIKING THE CHEST AT 11.5 M/S.

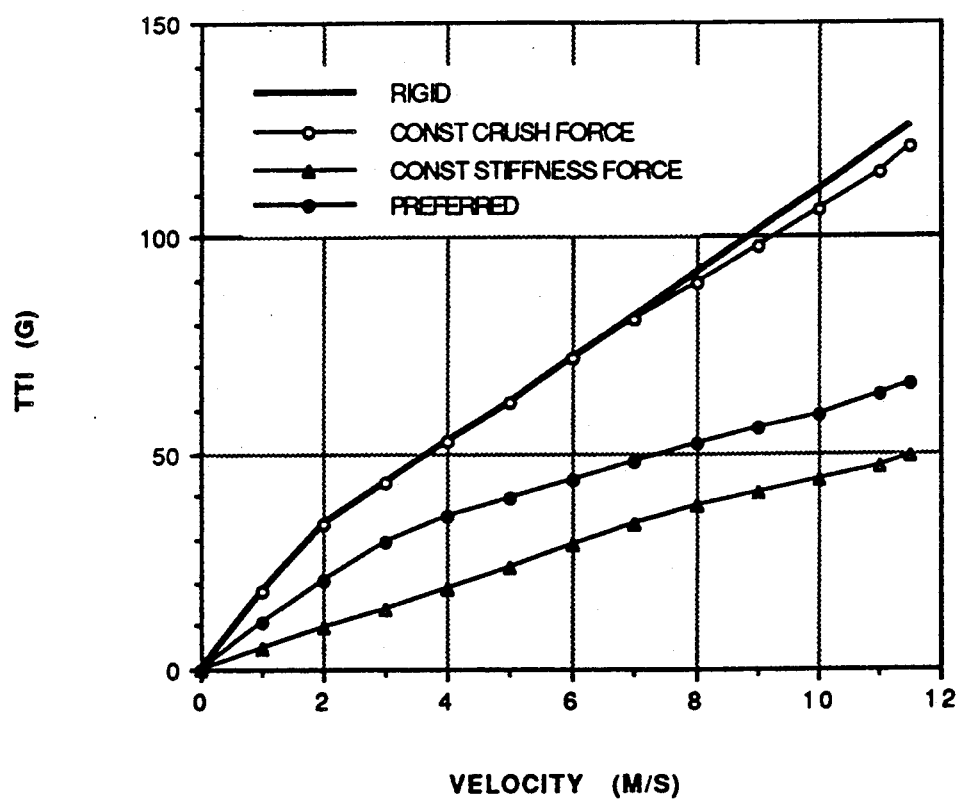
FIG. 6. THORACIC TRAUMA INDEX FOR DIFFERENT PADDINGS OF 10 CM THICKNESS EACH OPTIMIZED FOR A 20 KG IMPACTOR STRIKING THE CHEST AT 11.5 M/S

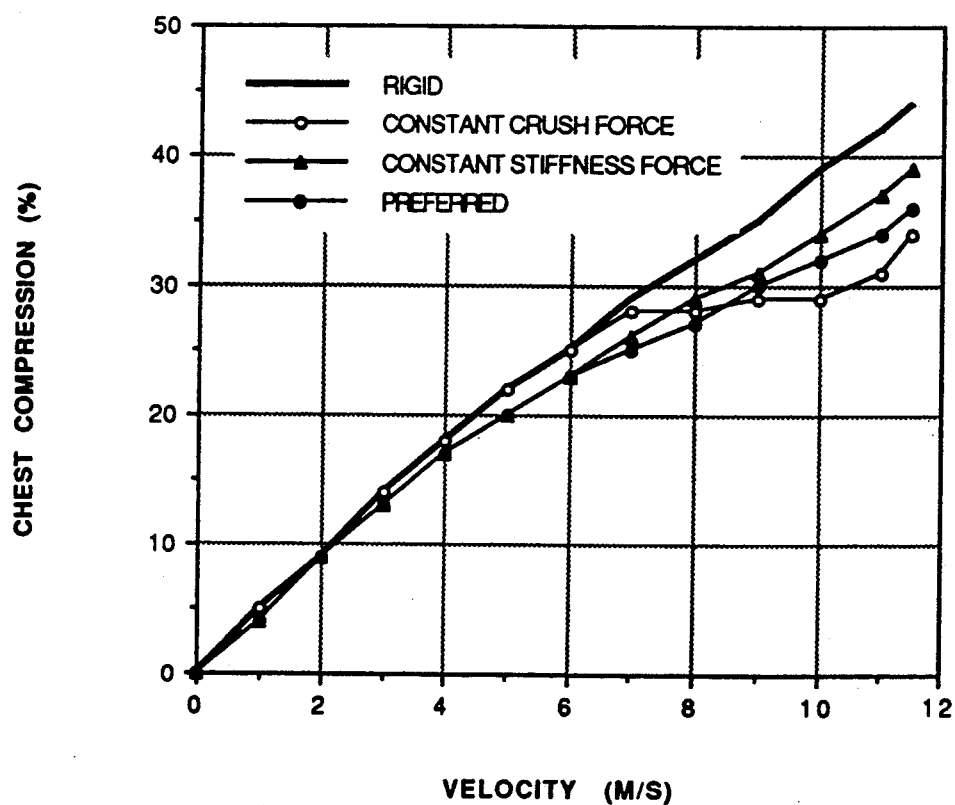
FIG. 7. CHEST COMPRESSION FOR DIFFERENT PADDINGS OF 10 CM THICKNESS EACH OPTIMIZED FOR A 20 KG IMPACTOR STRIKING THE CHEST AT 11.5 M/S FIG. 15. CUMULATIVE INJURY EXPOSURE RATE IN CAR-TO-CAR SIDE IMPACT CRASHES VS. MEAN CHANGE IN VELOCITY OF STRUCK VEHICLE FROM NATIONAL SEVERITY STUDY (NCSS) DATA FIG. 16. PLOT OF IMPACT VELOCITY VS. PADDING THICKNESS. EACH PADDING IS OPTIMIZED TO GIVE VC=1

PADDING TO REDUCE INJURIES IN AUTOMOBILE ACCIDENTS

BACKGROUND OF THE INVENTION

This invention relates primarily to providing a new method of cushioning the impact of vehicle occupants with the interior of the vehicle during an accident. Any interior surface except windows, which can be impacted by an occupant's head, chest, knees, thighs, shoulders, or any other portion of the body, would be a candidate for application of the improved padding which is the subject of this invention. Of particular interest is the application of this improved padding to vehicle doors, knee bolsters and headrests. Other applications would be for windshield headers, "A" pillars, "B" pillars, instrument panels, the interior vehicle roof, and seats.

Side impacts are responsible for one-third of the serious injuries sustained by occupants in automobiles involved in crashes. The majority of these traffic accidents involve other automobile or light trucks. In most cases of interest, the target vehicles are struck at angles which are within 30 degrees of orthogonal and on the driver side.[1]

[1] "Results of the National Highway Safety Administration's Thoracic Impact Protection Research Program", by J. R. Hackney, M. W. Monk, W. T. Hollowell, L. Sullivan, D. T. Wilke, SAE Paper 840886, May 1984.

Data collected by the National Accident Sampling System (NASS)[2] provide a basis for ascertaining the extent of injuries to automobile occupants in side impacts. Based on police reported accidents in 1985, 29% or 1,186,000 of the 4,067,000 occupants of cars and light trucks involved in motor vehicle accidents were in collisions involving side impact. 28,000 of these occupants sustained serious (AIS≧3) injuries. The Fatal Accident Reporting System (FARS)[3] provides another estimate of the relative significance of side impacts. In 1986, 24,833 fatalities occurred in passenger cars. Of these fatalities, 6,942 or 28% occured in situations where side impact was the principal impact and the vehicle did not overturn.

[2] National Accident Sampling System, 1985. "A Report on Traffic Accidents and injuries in the United States", National Highway Traffic Safety Administration, DOT-HS-807-074, Feb. 1987.
[3] FARS 1986 Database, National Highway Traffic Safety Administration.

The percentage of occupants injured or killed in side impacts is likely to increase now that air bag restraint systems are being widely adopted to protect occupants in frontal impacts. The National Highway Traffic Safety Administration (NHTSA) of the Department of Transportation is currently considering imposing regulations which will require protection of occupants in side impacts.

In a typical side impact, a "bullet" or striking car impacts the "target" or struck car. The bumper of the bullet car causes the door of the target car to intrude into the passenger compartment where it impacts the occupant causing injury. If the target vehicle door is weak and the front structure of the bullet car is strong, the door will impact the occupant at approximately the speed of the bullet vehicle. If, on the other hand, the target car has a strongly reinforced door and the bullet car a soft front structure, significantly less intrusion will take place and the impact between the door and the occupant will take place at a velocity which is equal to the bullet car velocity times the mass of the bullet car divided by the sum of the masses of the bullet and the target car. This is called the "momentum velocity". For impacts between vehicles of approximately equal weight, the velocity of impact between the occupant and the door for this second case would be approximately one-half of the bullet car's velocity. The first step, therefore, to reduce the injuries in side impacts is to reinforce the side structure and soften the front structure of vehicles. In frontal impacts, a vehicle typically strikes a rigid object such as a tree, pole, barrier or another car traveling in the opposite direction. The velocity change of the vehicle, therefore, is frequently close to the actual velocity of the vehicle. In side impacts, the typical accident is one car impacting a second car where the velocity change is approximately one-half of the impacting vehicle's velocity. The average velocity change in side impacts, therefore, is approximately one-half of the average velocity change in frontal impacts.

Experimental data of Dargaud and Bourdillon[4] on 30 MPH car-to-car side impacts show that $\Delta V$ of the struck vehicle is approximately the same as the maximum intrusion velocity of the side door at time of contact with the occupant. Their data show that for 30 MPH side impacts, the maximum door intrusion velocity is about 18 MPH. Hardy[5] also reported similar results.

[4] Dargaud R., and Bourdillon, T., *Simulation of Lateral Impact with Mobile Deformable Barrier*. SAE Technical paper No. 860051, 1986.
[5] Hardy, R. N., *Simulations to Assess the Influence of Car Lateral Impact Characteristics on Occupant Kinematics*. College of Aeronautics Report No. 8428, Cranfield Institute of Technology, Bradford, England, 1984.

Air bag systems have been designed for use in protecting occupants in side impacts. These systems work well; however, since the severity, as measured by the occupant velocity change, of side impacts is substantially less than for frontal impacts, air bag systems may not be necessary. In fact, as will be demonstrated below, as little as six inches of padding can provide excellent occupant protection for side impact velocities as high as 30 miles per hour.

Padding has additional advantages over air bag systems. Padding is always in place with nearly 100% reliability. Air bags, on the other hand, are deployed when a certain threshold speed is exceeded which is generally chosen to protect occupants in more severe cases. Therefore, the occupant in the air bag case will receive more injuries at impacts below the chosen threshold. Air bags are considered supplemental to seat belts for frontal occupant protection. In side impacts, however, the occupant sitting on the struck side of the vehicle does not receive protection from a seat belt. He is therefore much more likely to be injured in a side impact accident, especially below the chosen threshold, than an occupant wearing a seat belt in a below threshold frontal impact. Finally, the cost and complexity of side impact air bag systems greatly exceeds that of the padding systems described in this invention.

If an air bag is deployed in a side impact accident, it must be replaced. In contrast to frontal impacts, where the vehicle is totaled in most accidents severe enough to require an air bag, the vehicle in a side impact accident is frequently repaired. Thus, if a side impact air bag system is used, it would have to be replaced after an accident adding significantly to the vehicle repair cost. In most cases, the padding described in this invention would reset itself to its undeformed state and thus would be immediately available to absorb a second impact. In contrast, once a side impact air bag has deployed and deflated, no additional protection is available to the occupant should a second impact take place.

The design of knee bolsters has not received as much attention from air bag system designers as it deserves. In the case of the unbelted occupant, as taught by Brantman and Hatfield in U.S. Pat. No. 4,721,329, the knee bolster must absorb the kinetic energy of the lower torso of the occupant which is typically about one-half of the occupant's total kinetic energy. A properly designed knee bolster should also guide the knees to aline the femurs with the direction of force and minimize the tendency of the knees to slip off the knee bolster. Finally, since at the end of the accident, an air bag typically contains pressurized gas which propels the upper torso back toward the seat, the knee bolsters should also simultaneously propel the lower torso back into the seat. If this is not done, there is a possibility of neck injury due to the impact between the driver's head and the seat.

The padding system described in this invention, in addition to providing protection in side impacts also results in a highly efficient knee bolster design satisfying all of the above criteria. In addition, this knee bolster is available for protection in lower speed accidents where the air bag did not deploy and will reset itself in below threshold accidents.

The padding of the present invention can also be applied to headrests. Headrests are mainly useful to prevent hyperextension neck injuries to occupants in rear impacts. The padding of the present invention permits the design of headrests which have the minimum weight and the maximum injury reduction potential.

Vehicle doors, knee bolsters and headrests are three of many applications of the padding disclosed in this invention as will be described in detail below.

SUMMARY OF THE INVENTION

A preferred embodiment of the present invention consists of a padding composed of closed cells filled with air, each containing an orifice, or other restrictor, for the air to escape. The flow of the air through the restrictor provides the energy dissipation required of the padding, and the compression of the air itself provides the non-linear spring characteristic desired for minimizing injuries.

A particular object of this invention, therefore, is to provide a padding system which minimizes injuries to an occupant when the occupant impacts the padding during an automobile accident.

Another object of this invention is to provide a minimum cost padding system for automobiles.

Yet another object of this invention is to provide a minimum weight padding system, Yet another object of this invention is to provide a padding system for use as a knee bolster which helps align the occupant's knees for optimum support of the occupant's lower torso in an accident.

Another object of this invention is to provide a headrest designed to minimize head injuries in rear impacts.

Yet another object of this invention is to provide roof padding to minimize injuries during rollover accidents.

Still another object of this invention is to provide padding for use on roof support pillars of an automobile.

Yet another object of this invention is to provide a seat structure which deforms and absorbs energy during a crash to provide additional restraint to the occupant.

Still another object of this invention is to provide a multiple chambered padding system wherein the chambers are tunable to help control the motion of an occupant during an impact.

Still another object of this invention is to provide a padding system for use in automobile doors to minimize injuries in side impacts.

An additional object of this invention is to provide a padding which minimizes the Viscous Injury Response.

Still another object of this invention is to provide a padding which minimizes the peak acceleration experienced by the occupant in a crash.

Yet another object of this invention is to provide a padding which minimizes the Thoracic Trauma Index (TTI) experienced by the occupant in a crash.

Further features, objects and advantages of the present invention will become apparent from the following description taken in conjunction with the accompanying drawings.

BRIEF DESCRIPTION OF THE DRAWINGS

FIG. 4 is a comparison plot, based on computer simulations, of the peak Viscous Response versus impact velocity of an occupant impacting a door with no padding, a constant crush force padding, a constant stiffness padding and the preferred padding according to the present invention, utilizing an orifice restrictor with the cells.

FIG. 4A is a replot of FIG. 4 using a smaller impacting represented by a 10 kg mass.

FIG. 4B is a replot of FIG. 4 using a larger impacting vehicle represented by a 30 kg mass FIG. 4C is a plot of the peak Viscous Response versus occupant impact velocity for a preferred padding according to the present invention utilizing a viscous restrictor with the cells.

FIG. 5 is a comparison plot of the peak acceleration versus impact velocity of an occupant impacting a door with no padding, a constant crush force padding, a constant stiffness padding and the preferred padding according to the present invention.

FIG. 6 is a comparison plot of the Thoracic Trauma Index (TTI) versus impact impact velocity of an occupant impacting a door with no padding, a constant crush force padding, a constant stiffness padding and the preferred padding according to the present invention.

FIG. 7 is a comparison plot of the peak Chest Compression versus impact velocity of an occupant impacting a door with no padding, a constant crush force padding, a constant stiffness padding and the preferred padding according to the present invention.

DESCRIPTION OF THE PREFERRED EMBODIMENTS

Figure 1:
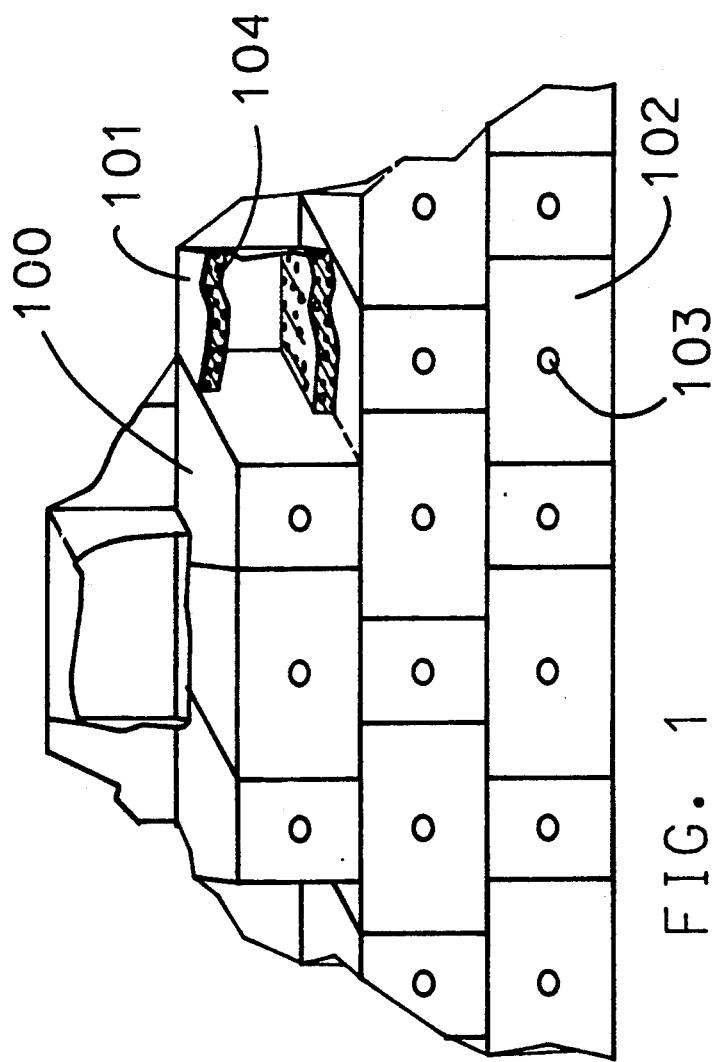
FIG. 1 is a perspective view of a group of cells, with portions removed, to make up a preferred embodiment of the padding according to the present invention.

FIG. 1 shows a plurality of cells having trapezoidal horizontal and rectangular vertical cross sections in an array of similar cells of energy absorbing padding according to a preferred embodiment of this invention. A cell shown generally as 100 has substantially a wedge shape formed by eight sides 101. One side 102 has a flow restricting orifice 103. An open cell foam 104 is placed within the cell adjacent to the two trapezoidal sides and acts as a spring to maintain the shape of the cell in the absence of an external force. Naturally other cell shapes would work as well and the shape of FIG. 1 is shown merely as illustration.

During the impact of an occupant with one or more cells, the gas within each cell is compressed and begins to flow through the orifice 103. The flow rate through the orifice depends on the pressures of the air inside and outside of the cell. The pressure inside the cell is increased as the occupant penetrates the cell in approximately proportion to the relative velocity of the occupant and the cell support. The flow of the gas out of the cell is proportional to the square root of the pressure difference and thus it can be shown that the force on the occupant is approximately proportional to the square of the relative velocity between the occupant and the cell support. This is known as "velocity squared damping".

Figure 1B:
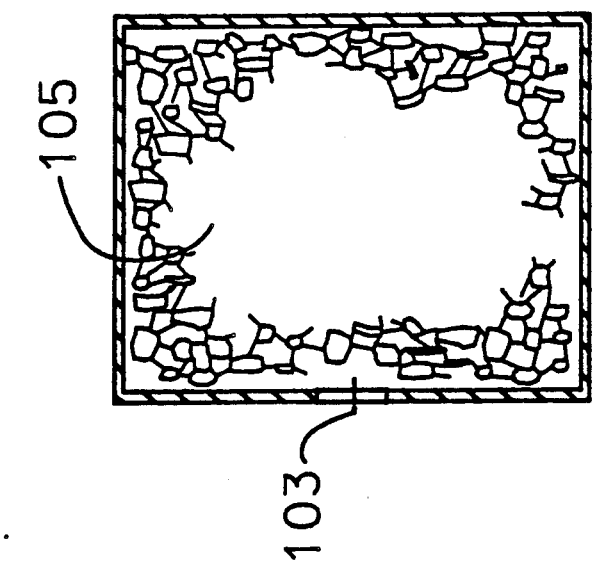
FIG. 1B is an alternate spring design to maintain the shape of the cell using a spring made from plastic or glass fibers.
Figure 1A:
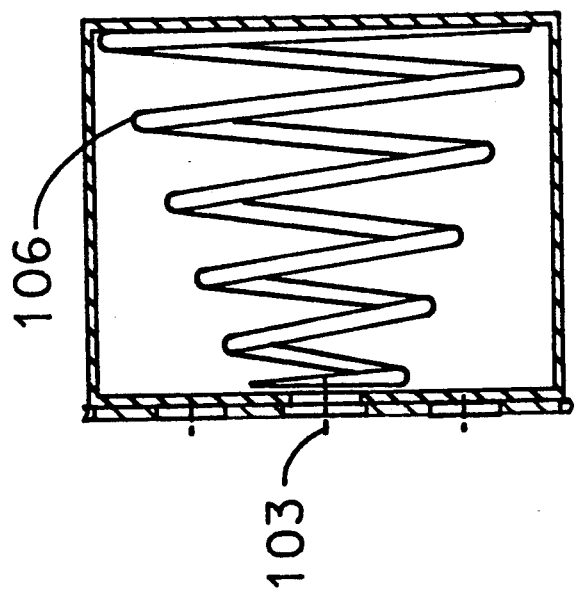
FIG. 1A is an alternate spring design to maintain the shape of the cell using a conical shaped coil spring.

The preferred spring design shown in FIG. 1 uses an open cell elastomer (plastic or rubber) foam 104. FIG. 1B is an alternate design using a filler for the cell made from glass or plastic fibers 105, and has the advantage of a large ratio of volume to mass of the material. Glass fibers, for example, as used in glass wool occupy only 5% of the total volume. Such a material compresses to a flatter section when the cell is fully compressed therefore giving more useful volume for absorbing occupant energy. A more expensive but even flatter designs are shown in FIG. 1A where a coil spring 106 is shown with the coils are successively smaller permitting the spring to compress to a height of about one strand thickness.

Figure 2:
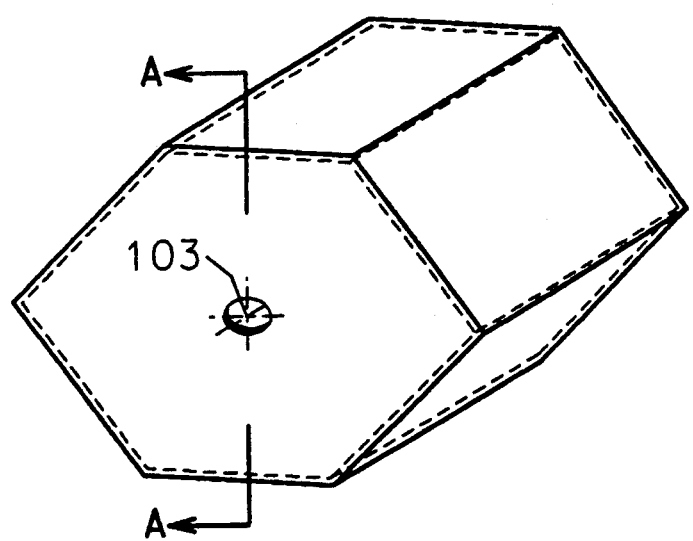
FIG. 2 is an enlarged view of a single cell similar to FIG. 1 but having a hexagonal shape.
Figure 2A:
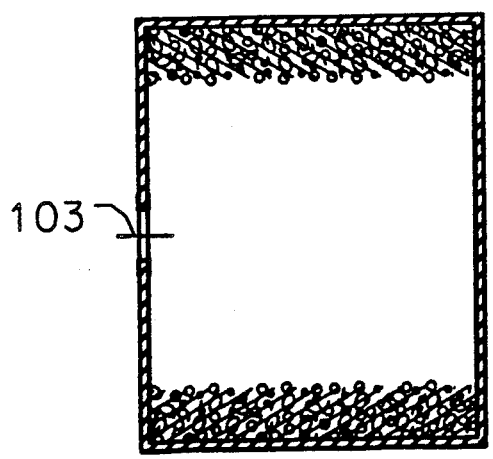
FIG. 2A is an enalarged sectional view of the sharp-edged orifice restrictor taken along line A—A of FIG. 2.
Figure 2B:
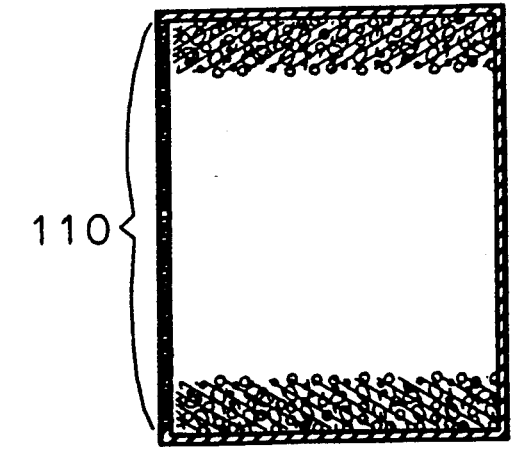
FIG. 2B is an alternate restrictor designed to achieve viscous damping employing a large number of small holes.

The fluid restricting device in FIG. 1 is a sharp-edged orifice. Other restrictors with different properties can be used with different results. FIG. 2A shows an enlarged detail of the simple, sharp-edged orifice of FIG. 1. FIG. 2B illustrates a viscous restrictor geometry formed from material having a large number of small holes 110. Such a restrictor gives a flow which is linearly proportional to the pressure drop across the restrictor, and thus gives rise to a damping force on the occupant which is proportional to the first power of the occupant's relative velocity.

Figure 2C:
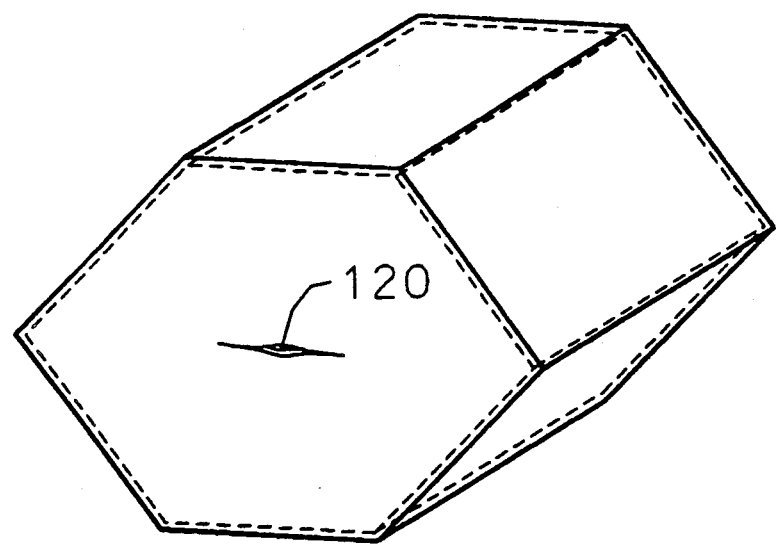
FIG. 2C is an alternate restrictor design employing an orifice whose area changes with pressure inside the cell, shown with the orifice substantially closed.
Figure 2D:
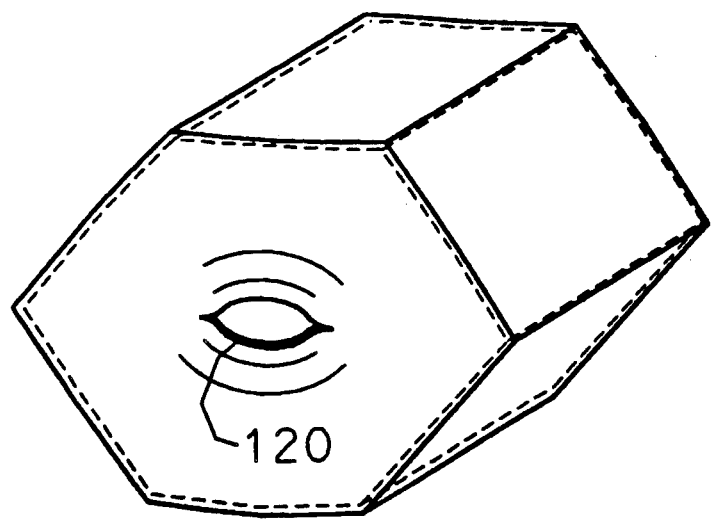
FIG. 2D is a view of the design of FIG. 2C with the orifice substantially open.

FIG. 2C illustrates conceptually the use of a variable orifice restrictor 120 in the closed state and FIG. 2D in the open state. Such a restrictor can be designed to open the orifice sufficiently to maintain an approximately constant pressure inside the cell. Such a mechanism could be used, for example, to create a padding which provides a constant force to the occupant. This function would be desirable if the injury predictor used, for example, is maximum chest G's.

Figure 3:
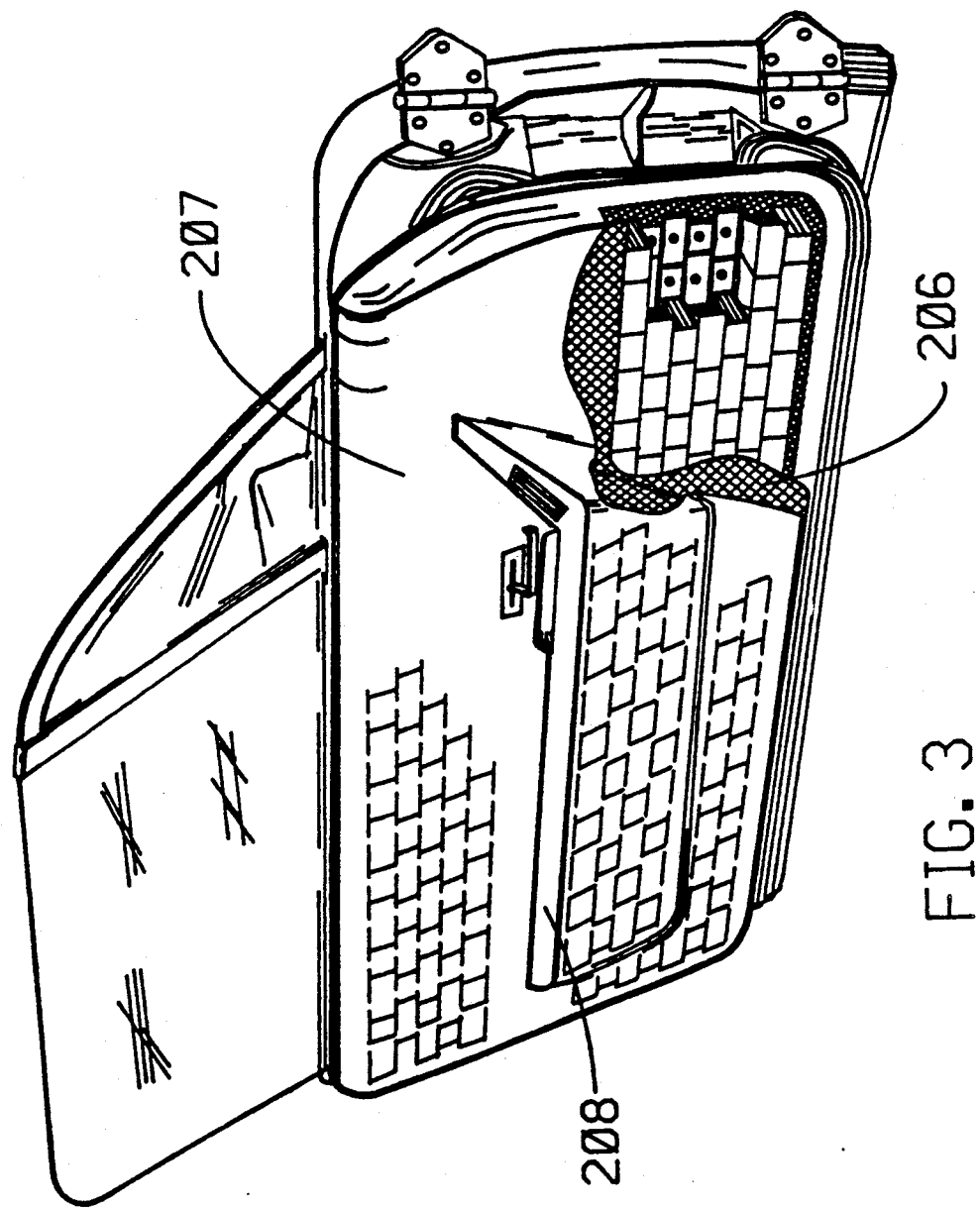
FIG. 3 is a partial perspective view with portions cut away of a vehicle door showing a plurality of cells having a rectangular cross section making up a preferred embodiment of the padding according to the present invention.

FIG. 3 shows a perspective view of a vehicle door incorporating a plurality of trapezoidal shaped cells such as shown in FIG. 1. For this case, the orifices are shown at the center of the cells. In another embodiment, not shown, the holes are placed in the bottom of each cell in order to drain any condensation which might otherwise result in water accumulating inside the cells. In this door design, the cells are covered by a thin, stiff membrane 206 on to which is attached a decorative cover 207. An arm rest 208 is formed into the cover. In one preferred design, the upper layers of cells have smaller orifices in order to make them stiffer. This has the effect of causing some rotation of the torso of the occupant toward the vehicle center in order to reduce the tendency of the occupant's head striking the window.

Upon experiencing a side impact, the occupant attains a velocity relative to the door as the door is pushed toward the occupant by the impacting vehicle (the bullet car). The occupant impacts the door and begins pushing the cover against the padding. The padding begins to compress, increasing the gas pressure inside the cells. This pressure exerts a force on the cover which, in turn, resists the motion of the occupant. As the padding compresses, the occupant is gradually brought to the same velocity as the door in a controlled manner which minimizes injury to the occupant.

Various studies have attempted to correlate injuries to human occupants of a vehicle in a crash with various physical quantities which can be measured in crash tests using an anthropomorphic dummy. For example, for head injury, a criteria called "HIC" has been devised which states that head injury is proportional to the acceleration experienced by an occupant's head during a crash raised to the 2.5 power. Similarly, for certain types of restraint systems, the peak acceleration experienced by the occupant's chest has been used to predict occupant injury. More recently, research done by David Viano[6] and Ian Lau of General Motors Research Laboratories has shown that the best predictor of thoracic injuries such as occur in side impacts is the viscous response or "VC". In this paper the following definitions are presented by Viano and Lau:

Viscous Criterion: any generic biomechanical index of injury potential for soft tissue defined by rate sensitive torso compression.

Viscous Response: VC, a time function formed by the product of velocity of deformation, V(t), and the instantaneous compression C(t).

Viscous Tolerance: risk of soft tissue injury associated with a specific impact-induced viscous response, VC. The maximum risk occurs at the peak viscous response, [VC]max.

[6] Lau, I. V., and Viano, D. C., *The Viscous Criterion—Bases and Applications of an Injury Severity for Soft Tissues*. SAE Technical paper No. 861882, 1986.

The development of the VC is covered in detail in papers by Viano and Lau which are included herein by references[7,8]. Simply stated, the VC states that injury is caused by the product of the amount of chest compression and the rate of compression. Using this response criterion the optimum padding would provide a large force to the occupant at the time that the occupant initially contacts the padding when the penetration is low, and a progressively smaller force as the penetration increases while the velocity is still significant and, finally, a larger force at the end of the impact when the penetration is maximum but the velocity is small. Typical padding used in vehicle interiors has a considerably different response function. As the padding is compressed, the force on the occupant increases sometimes linearly and sometimes exponentially.

[7] Viano, D. C., and Lau, I. V., *Thoracic Impact: A Viscous Tolerance Criterion.*, Proceedings of the Tenth Experimental Safety Vehicle Conference, NHTSA, Oxford, England, 1985.
[8] Viano, D. C., and Lau, I. V., *A Viscous Tolerance Criterion for Soft Tissue Injury Assessment.*, General Motors Research Laboratories publication GMR-5375, 1987.

As illustrated in the work of Viano and Lau, a great deal of effort has gone into developing a padding which provides a constant force to the occupant and one in which the force increases linearly with penetration[9,10]. This is an improvement over standard padding, however, the padding of this invention more closely meets the desired response function since the force on the occupant is proportional to the square of his relative velocity. Since the velocity of the occupant is greatest when first he first impacts the padding, the force will be greatest at a point where the occupant has the greatest tolerance. Later, when the padding has penetrated a large amount into the torso of the occupant, the velocity is low and the force from the padding is also lowest where the tolerance in minimum. At the extreme penetration, the padding bottoms out and the force increases as the velocity approaches zero. An additional spring can be added to increase the force on the occupant somewhat prior to the point where the padding begins to bottom out to further optimize the padding based on the viscous response.

[9] Viano, D. C., Evaluation of the Benefit of Energy-Absorbing Material in Side Impact Protection: Part I. SAE Technical Paper No. 872212, 1987.
[10] Viano, D. C., Evaluation of the Benefit of Energy-Absorbing Material in Side Impact Protection: Part II. SAE Technical Paper No. 872213, 1987.

In addition, a constant force padding gives the same pressure on the occupant regardless of the occupant size or accident severity. The preferred padding according to the present invention provides a force which increases as the occupant relative velocity increases and thus substantially adjusts for crash severity. Furthermore, the padding adjusts much as an air bag does for occupant size through the wraparound of the padding.

FIG. 4 shows a comparison of the maximum Viscous Response for various proposed padding systems, all of which have been optimized to minimize the VC for a crash with the bullet car impact velocity of 11.5 M/S (25.7 MPH). A VC value which exceeds 1 indicates a significant probability of serious injury or fatality. A maximum padding compression of 10 CM (four inches) has been assumed in optimizing the designs for each of the padding systems. The preferred padding of this invention yields a VC of 1 for a crash of 11.5 M/S and drops significantly to less than 0.5 at 6 M/S (13.5 MPH). In contrast, for a padding system providing a fixed force the VC is shown to be 1.1 at 11.5 M/S and is consistently higher than the inertially gas damped padding of this invention for all impact velocities. Also, for the case of an ideal spring padding, the constant stiffness case, the value of VC is 1.2 for 11.5 M/S and is also consistently higher than the preferred padding for all velocities. Generally speaking, a VC of 1 is the maximum allowable and corresponds to a risk of very serious or fatal injury (AIS≧4) of about 5%.

For the purpose of this analysis, a 20 KG impactor mass has been used to represent an impact of two cars of equal mass. This technique was pioneered by Viano[9,10] where the 20 KG mass was chosen because it gave about the same pulse period and kinetic energy transfer as actual crashes. By coincidence, the ratio of initial impactor velocity to dummy velocity is about the same as the ratio of bullet car velocity to dummy velocity. As the side door structures are made stiffer to reduce the door/occupant impact velocity and to stretch the pulse, the proper impactor will also probably change.

[9] Viano, D. C., Evaluation of the Benefit of Energy-Absorbing Material in Side Impact Protection: Part I. SAE Technical Paper No. 872212, 1987.
[10] Viano, D. C., Evaluation of the Benefit of Energy-Absorbing Material in Side Impact Protection: Part II. SAE Technical Paper No. 872213, 1987.

In order to get an understanding of the effect of different padding designs for impacts of vehicles of different masses, FIG. 4A considers the case of a lighter bullet vehicle represented by a 10 KG impactor mass, and FIG. 4B considers a heavier vehicle represented by a 30 KG mass. For the lighter bullet vehicle case, the preferred padding and the constant stiffness padding both adjust to the crash and give improved results with the preferred padding showing greater improvement. For the larger vehicle, all of the paddings bottom out at 10 m/s with the preferred padding still showing the best results. From these plots, the preferred padding is shown to be more adaptive to impacts vehicles of different mass.

For some applications involving other parts of the occupant's body, or to be responsive to some other yet unarticulated injury criteron, a padding which yields a force which is proportional to the first power of the velocity may be desired. FIG. 4C illustrates the viscous response which would be expected from padding composed of cells shown in FIG. 2 containing the viscous restrictor shown in FIG. 2B. As would be expected, this padding provides significantly better protection based on the VC than the fixed force padding, but not quite as good as the inertially damped preferred padding of FIG. 4.

There is debate in the literature as to what the appropriate injury measurement parameter is for injuries to different parts of the human body. FIG. 5, FIG. 6 and FIG. 7 illustrate the performance of the padding systems optimized for VC (FIG. 4) against three other injury measures. FIG. 5 presents the results for the case where the maximum spinal acceleration is the desired measurement of injury. This is similar to the maximum chest acceleration criterion used in judging compliance with Federal regulations for frontal impact. From this plot it can be seen that the proposed padding performs well for all but the highest velocity impacts where the constant force padding is preferred. A padding yielding a constant force could be achieved by replacing the fixed orifice restrictor in the padding with an orifice whose area varies to maintain a constant pressure in the cells as shown in FIG. 2C and FIG. 2D. The preferred padding to optimize for this injury measure would, therefore, be a cellular padding with a fixed and a variable orifice, which could be combined into one, where the total orifice area remained constant until the pressure associated with the higher velocities was encountered, at which time the variable orifice would maintain a constant pressure.

The preferred padding of FIG. 4 also performs well against the Thoracic Trauma Index as shown in FIG. 6. Its performance would even be relatively better if each padding were optimized for this injury measure.

The results for the chest compression injury measure also show that the preferred padding of FIG. 4 performs well as shown in FIG. 7. Once again a combination of fixed and variable orifices would provide even better protection. One key advantage of this preferred padding, therefore, is that regardless of the injury measure used, the padding performs nearly optimum even though it has been optimized for the VC injury measure. This padding would be a safe choice until the biomechanics community agrees on the appropriate way to measure injuries.

For those applications described above where the peak acceleration is used as the predictor of occupant injury, a variable orifice restrictor such as shown in FIG. 2C and FIG. 2D could be used with padding composed of cells shown in FIG. 1.

Commercially sold automobiles, at present, do not utilize as much as 4 inches of door padding. In fact more than ½ inch of padding is rare. The VC for a rigid door is also shown in FIG. 4. Such a door can be expected to yield a significant percentage of fatal injuries at a crash velocity of 16 miles per hour. If a constant stiffness padding could be designed to provide a quadrupling of the force between 1 and 4 inches of compression, it would have a VC similar to the constant stiffness padding shown in FIG. 4. From the above graphs, it can be seen that a substantial reduction in fatal side impacts can be accomplished through the use of the padding of the present invention.

The Thoracic Trauma Index (TTI) injury measure mentioned above has the following definition:

Thoracic Trauma Index (TTI): A measure of likelihood of serious injury to the hard thorax resulting from a blunt lateral impact developed by[11]

$$TTI = 1.4 AGE + 0.5(RIBY + T12Y) MASS/Mstd$$

where:
AGE = age of test subject (in years)
RIBY = maximum absolute value of acceleration of rib on struck side in lateral direction after the acceleration signal has been filtered according to specifications (in G's)
T12Y = maximum absolute value of acceleration of the twelfth thoracic vertebrae, in the lateral direction after the acceleration signal has been filtered according to specifications (in G's).
MASS = subject mass
Mstd = standard mass (165 lbm = 75 kg)
In this proposal[11], TTI is defined as:

$$TTI = 0.5(A'rib + Asp)$$

where
Asp is the maximum spine acceleration (in G's)
A'rib = 0.5 Arib + 30 if Arib > 60 G
A'rib = Arib otherwise
Arib is the maximum near-side rib acceleration (in G's).

[11] Morgan R. M., Marcus J. H., and Eppinger R. H., *Side Impact—The Biofidelity of NHTSA's Proposed ATD and Efficacy of TTI*. SAE Technical paper No. 861877, 1986.

It has been sometimes suggested that closed cell foam be used for padding. This yields a padding which, for the same velocity of deformation, has an increased retarding force as the depth of penetration increases. This type of padding is unsuitable since it acts as a non-linear spring giving the minimum force at the beginning of the impact and the maximum force at the end, exactly opposite the padding of this invention prior to the padding bottoming out. Open cell foam has also been suggested; however, unless it is used merely as a spring in a cell as taught by this invention, it is also not suitable. If a dense open cell foam is used, some inertial flow damping can be achieved, but the restrictors, which are now the holes in the small pores in the foam, will gradually close as the foam is compressed once again yielding a padding with a stiffening characteristic with deformation.

The ratio of the orifice area to the average surface area on which the orifice is formed, which has been found suitable for use in cushioning the impact of an occupant in a particular door application, was about 6%. Naturally this will vary from application to application.

Figure 8:
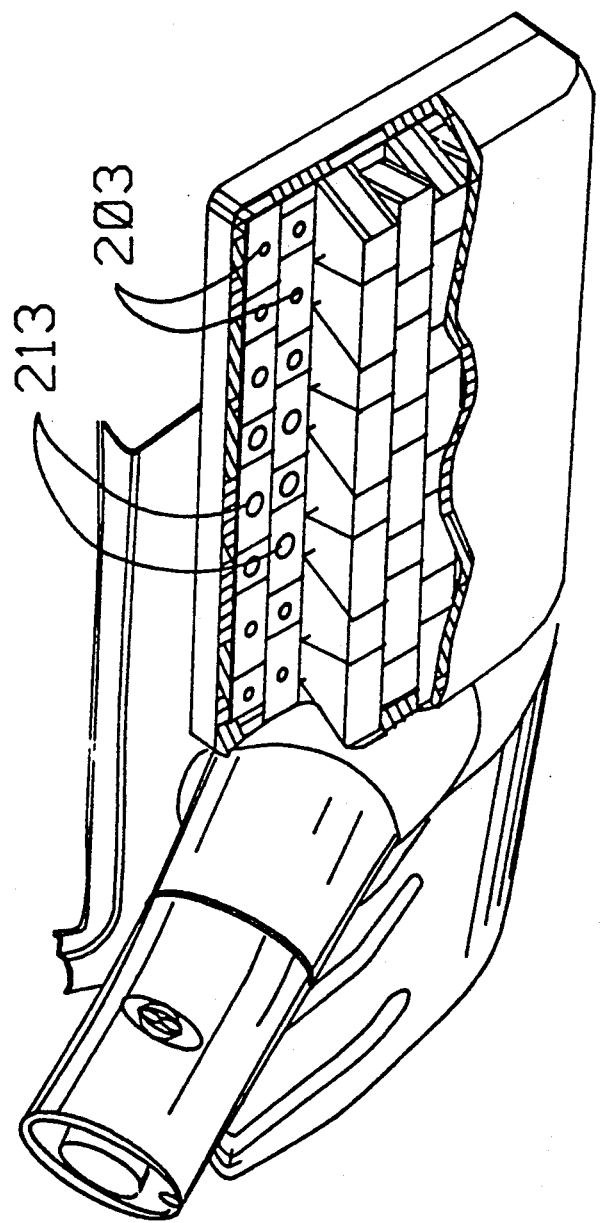
FIG. 8 is a partial perspective view with portions cut away of a knee bolster constructed from the preferred padding, according to the present invention, which positions the knees and absorbs energy in a frontal impact.

An application of the gas damped cellular padding of this invention to a knee bolster is shown in FIG. 8. In this case, the cells are designed with smaller orifices 203 on the left and right sides of each bolster and with larger orifices 213 in the center cells. In this manner the outermost cells exert a higher force on the occupant's knees than the inner cells. This has the effect of preventing the occupant's knees from sliding off the knee bolster and instead, the knees are diverted so as to align the occupant's knees with the longitudinal direction of the vehicle. In this manner, for a head-on crash, the knees are optimally positioned to transfer force from the knee bolster to the lower torso. The knees are properly positioned and prevented from sliding off the knee bolster which could result in serious injuries to the occupant.

Figure 9:
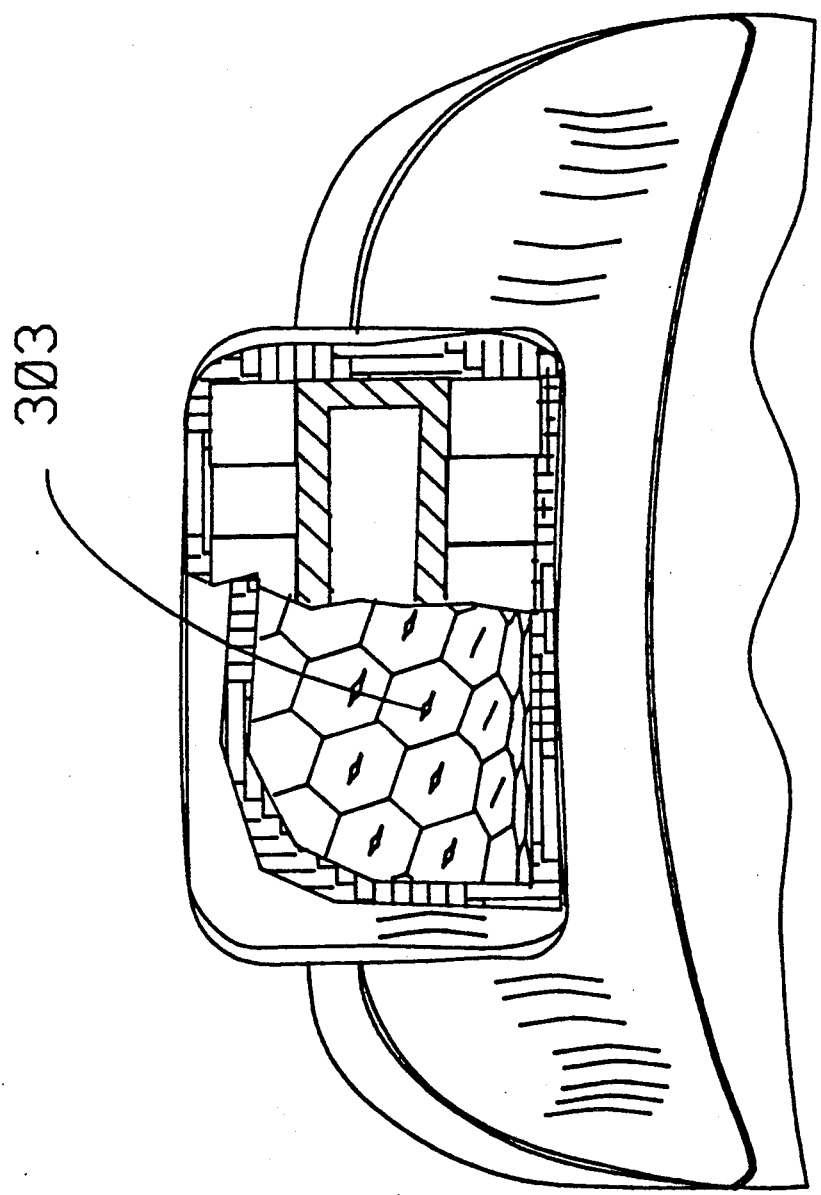
FIG. 9 is a perspective view with a portion cut away of a headrest constructed of the preferred padding according to the present invention.

FIG. 9 shows the application of a preferred embodiment of the padding of this invention to headrests. Headrests are provided to prevent hyperextension of the neck of an occupant during a rear impact. The impact of an occupant's head with the headrest, however, can itself be a cause of injury. Normal headrest padding provides a greater force on the occupant's head as the penetration of the head into the headrest increases. The accepted predictor of head injury is a quantity called the "Head Injury Criterion," or "HIC". The HIC is proportional to the peak acceleration experienced by an occupant's head raised to the 2.5 power. The ideal headrest, therefore, should minimize the maximum acceleration imparted to the head and therefore gas damped cellular padding, wherein the flow restrictor adjusts to limit the maximum acceleration, would be optimal. FIG. 9 illustrates a headrest using the variable orifice restrictor 303 which was shown in detail in FIG. 2C and FIG. 2D.

Figure 10:
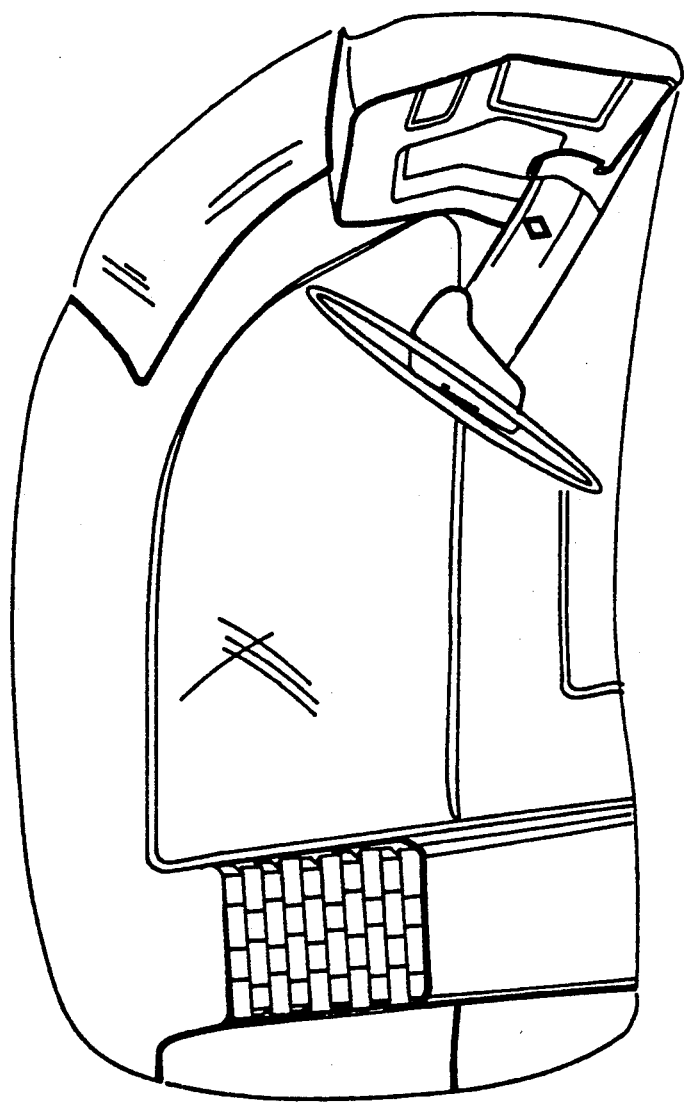
FIG. 10 is a perspective view of the application of the padding according to the present invention to a vehicle A pillar.
Figure 11:
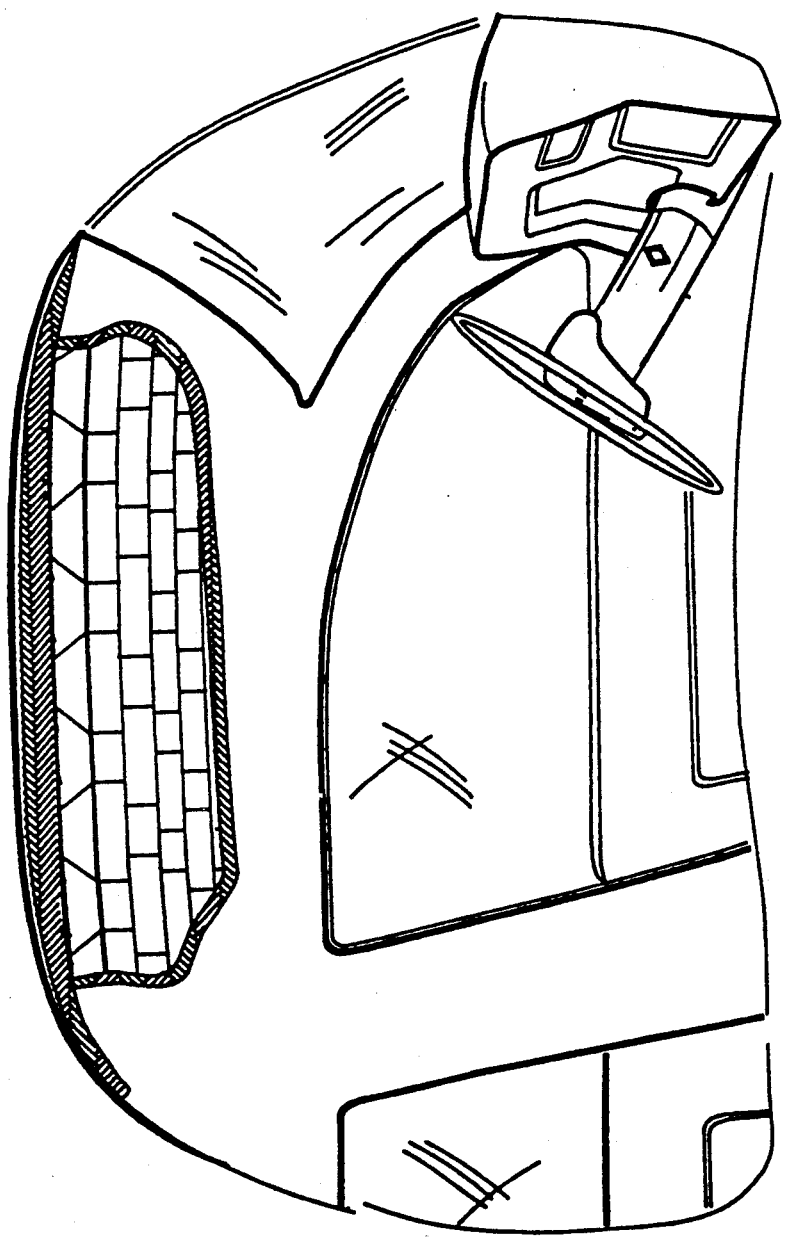
FIG. 11 is a perspective view of the application of the padding according to the present invention to a vehicle roof.
Figure 15:
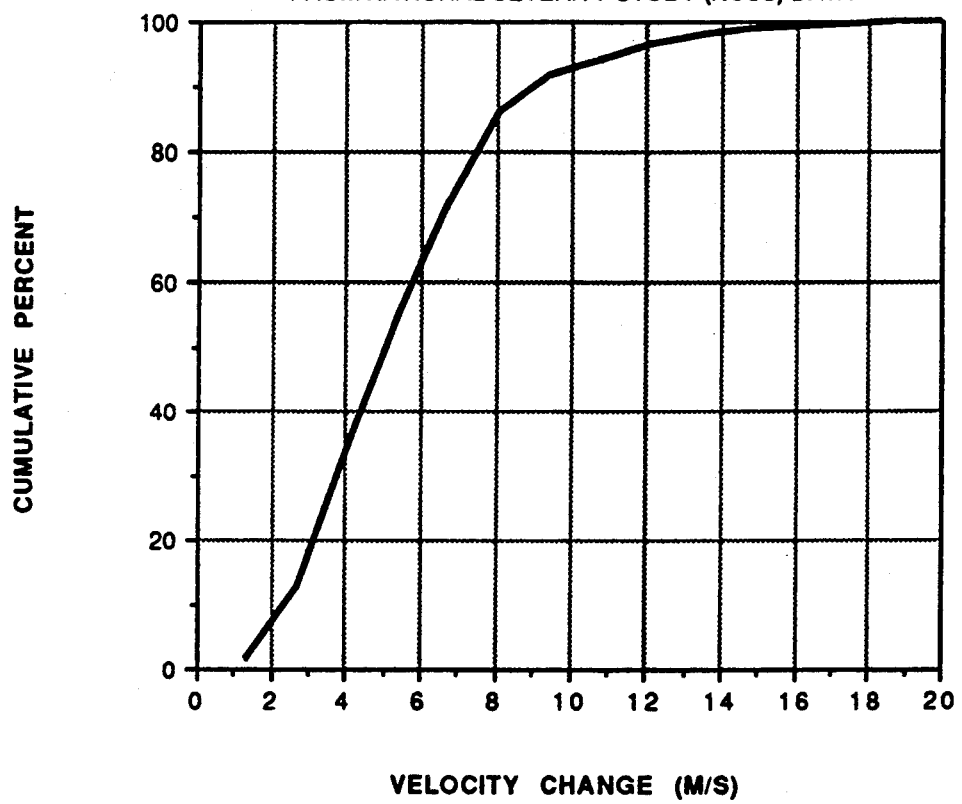
FIG. 15 is a cumulative frequency plot of the injury exposure rate in car-to-car side impacts versus the mean velocity change of the struck vehicle.
Figure 16:
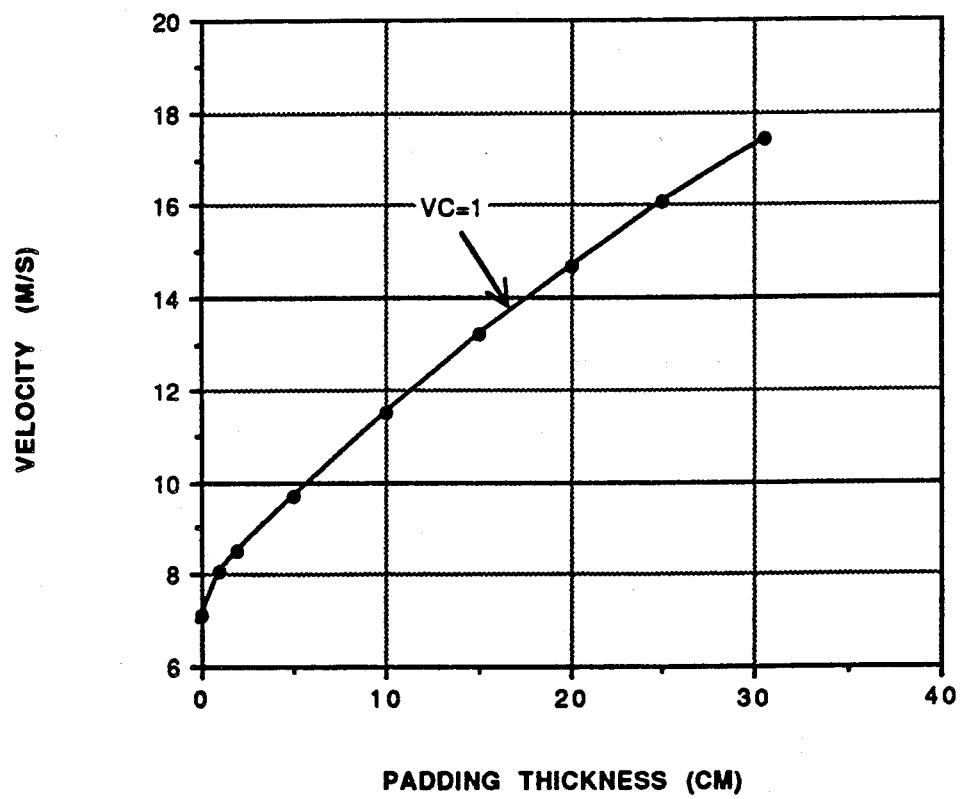
FIG. 16 is a plot showing the relationship between padding thickness necessary to achieve a VC of 1 and the bullet car impacting velocity.

The padding described in this invention can, of course, be applied to any structure which is likely to be impacted by a vehicle occupant in a crash. FIG. 10 shows the application of one inch of this padding, for example, to the B-pillar support structure and FIG. 11 shows the application of three inches of this padding to the roof of a vehicle in order to minimize head injuries in rollover accidents. The thickness of the padding determines the amount of protection provided as shown in FIG. 16. FIG. 15 is a cumulative frequency plot of the injury exposure rate in car-to-car side impacts versus the mean velocity change of the struck vehicle from a paper by Rouhana and Foster[12]. The velocity change in the struck vehicle is about ½ of the bullet car impact velocity, and FIG. 16 shows that a padding thickness of about 6 inches will provide protection in a 30 MPH accident (a velocity change of 15 MPH). FIG. 15 then shows that this will protect the occupant in virtually all car-to-car side impact crashes.

[12] Rouhana, S. W., and Foster, M. E., *Lateral Impact-An Analysis of the Statistics in the NCSS.*, SAE Technical paper No. 851727, 1985.

As has been shown, the preferred padding of the present invention makes the most efficient use of space of all of the paddings studied. In addition, the above analysis has assumed that the padding thickness is equivalent to the total compression before bottoming out which each padding permits. Actual implementations of each padding design requires additional thickness equal to that of the crushed material. This added thickness is minimum in the padding of this invention since most of the padding volume is gas!

Figure 12:
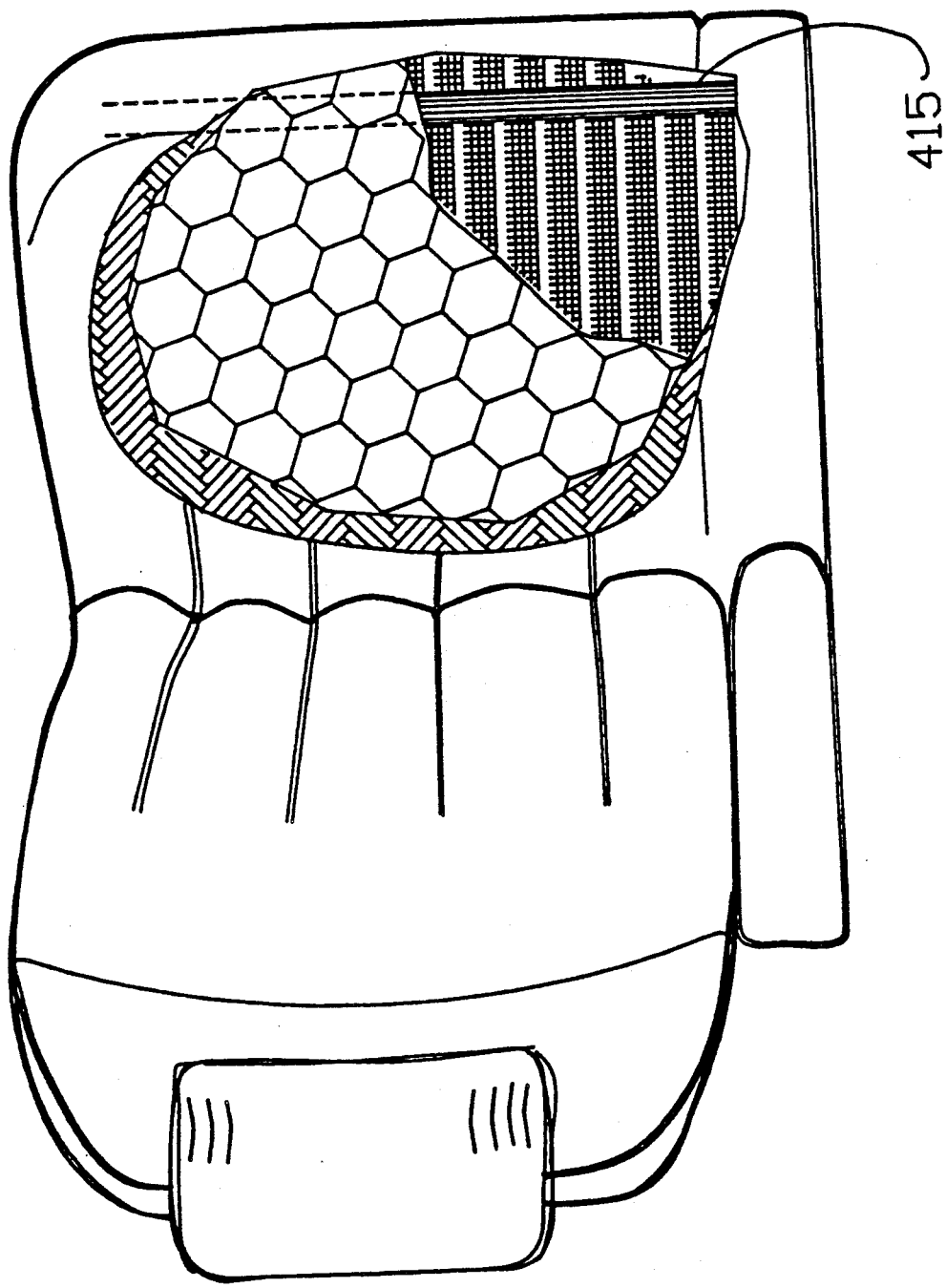
FIG. 12 is a perspective view with portions cut away of a vehicle seat utilizing the preferred padding according to the present invention, along with other structure to aid in restraining an occupant during a vehicle crash.

The application of the padding disclosed herein to seats is illustrated in FIG. 12. In some vehicle passenger compartment designs, the opportunity exists to utilize the seat as part of the restraint system, reducing injury to the occupant's femurs. These designs would augment the knee bolster rather than replace it. In some crashes, the structure of a particular vehicle can deform by buckling in a manner increasing the tendency of the occupant to submarine underneath the air bag. In both of these cases, an anti-submarine structure can be designed into the front of the seat as shown in FIG. 12. During an accident, a vertical force can be applied to the occupant, either through the seat belt or through interaction with the air bag or the instrument panel in such a manner as to force the occupant into the vehicle seat. If the padding described in this invention is used as part of the seat structure, this downward force will result in a controlled displacement of the occupant into the seat and aid in absorbing the kinetic energy of his lower torso. Then, as the occupant moves forward in the crash, he is somewhat restrained by an anti-submarine bar 415 placed in the front of the seat. The internal springs in the cells for this application are considerably stronger than for other applications to prevent collapse of the cells except during a crash.

A primary advantage of the padding described in this invention is that it will return to its undeformed state after the impact is over providing the supporting structure is not damaged and thus padding will not always have to be replaced after an accident. Other padding systems remain permanently deformed.

Figure 13:
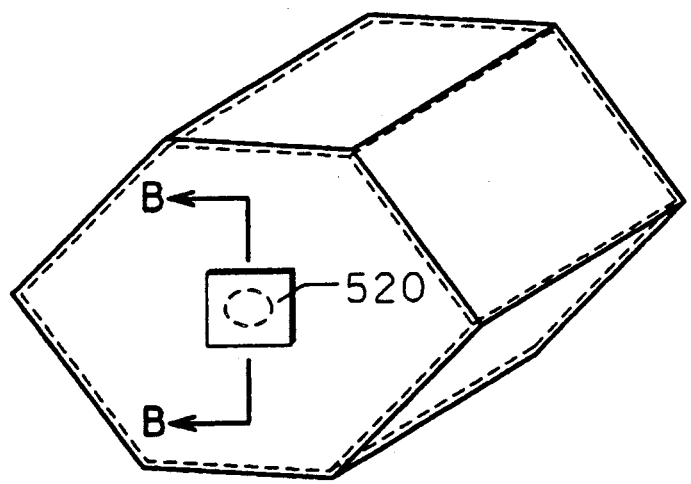
FIG. 13 is a perspective view of an alternate preferred embodiment of an individual cell utilizing presurized gas.
Figure 13A:
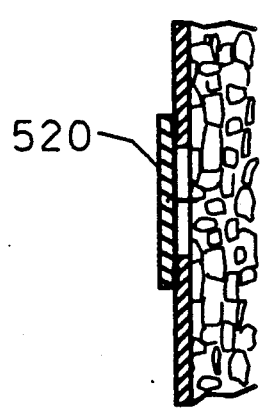
FIG. 13A is a partial cutaway view taken along line B—B of FIG. 13 showing the blow out patch.
Figure 13B:
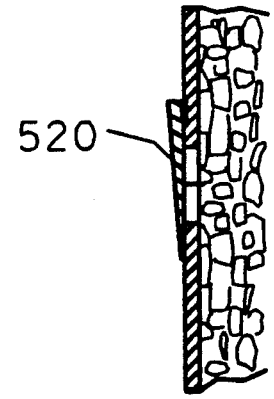
FIG. 13B is a partial cutaway view of an alternate design of a blow out patch using a bounded flap valve.

As shown in FIG. 4, the padding using ambient air pressure performs well up to vehicle impact velocities of 25.7 miles per hour. As the velocity of occupant-/door impact increases, the compressibility of the air plays a larger role and the padding begins to deviate from optimum. A padding design to protect in higher velocity impacts, therefore, would perform better if the ambient pressure inside the cell were above atmospheric pressure. This can be accomplished as shown in FIG. 13 where the gas is pressurized. For this case, a blowout patch 520 can be used to cover the orifice and maintain the higher pressure. During the accident, the occupant would impact one or more cells, increasing the pressure to the point that the force on the blowout patch exceeds the strength of the material bonding it to the cell. FIG. 13A and FIG. 13B show two examples of blow out patch design. Since the pressure in the cell is higher than atmospheric, the motion of the cell outer surface required to achieve a force equilibrium between the padding and the impacting occupant is less. The design shown in FIG. 13, of course, would not reset to the initial condition after the accident and would have to be replaced. The use of pressurized cells permits a more compact padding design. To achieve 30 MPH impact protection for an occupant would otherwise require a padding thickness in excess of 10 cm as shown in FIG. 16.

Figure 14:
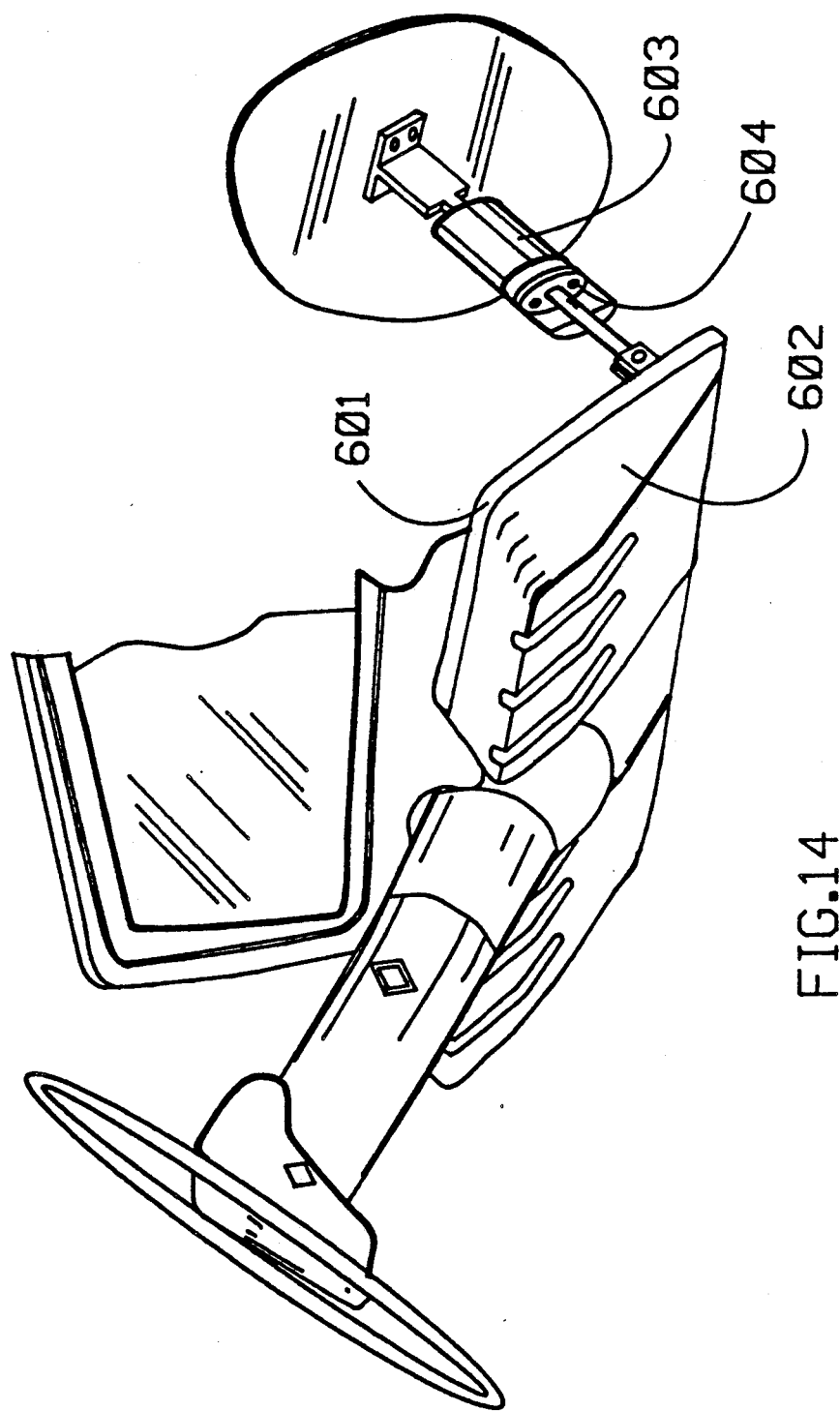
FIG. 14 is a cut-away view of an alternate embodiment of this invention utilizing a liquid dashpot as the energy absorbing mechanism.

The preferred embodiment of this invention utilizes gas and, in particular, air to achieve the energy absorption required of the padding. For some applications, where space is limited, a liquid dashpot device could also be used. FIG. 14 shows the use of a liquid dashpot in a knee bolster design where space is limited. In this case, the knee bolster consists of a formed, thin plate 601 covered with knee capturing and energy absorbing foam structure and cover 602 such as taught by Brantman and Hatfield in U.S. Pat. No. 4,721,329, which is held in place by two dashpots 603. As the knee bolster is impacted by the occupant's knees, pressure in the fluid in the dashpot is increased, causing the liquid to flow through the orifice 604 dampening the motion of the knee bolster. Restrictors can be designed in the dashpot to achieve either viscous or inertial damping in a manner similar to that described above as desired.

The padding of this invention, when used with an orifice restrictor, has characteristics somewhat similar to those of an air bag. A major difference is that the padding is inflated and in place at all times when needed. Air bags need an additional source of gas and need to be inflated to a pressure above ambient. In addition they will not reset after use and thus must be replaced. In addition, air bags are noisy and contribute noxious gas into the passenger environment. The padding of this invention has the injury reducing potential of an air bag plus many other advantages as listed above.

An important aspect of this invention is the use of padding composed of multiple cells. In this manner, the motion of the occupant can be better controlled since each cell collapses more or less independently and the occupant is less likely to slide off the padding. The use of multiple cells, as described above, also permits the variation of the force exerted on the occupant by the different cells which, in the case of the knee bolster, helps to align the knees with the direction of force. In the case of the door padding, this variation in cell restrictor size causes more force to be applied to the upper torso than to the lower torso causing the occupant to rotate and minimizing the chance of the occupant's head impacting the window. If a single cell were used, as in the case of a conventional air bag, the air would be free to move anywhere within the cell and thus not oppose the lateral motion of the occupant. The use of multiple cells in effect causes the padding to capture the occupant at the point that he first impacts the padding. This gives much better control over the lateral motion of the occupant.

Figure 17:
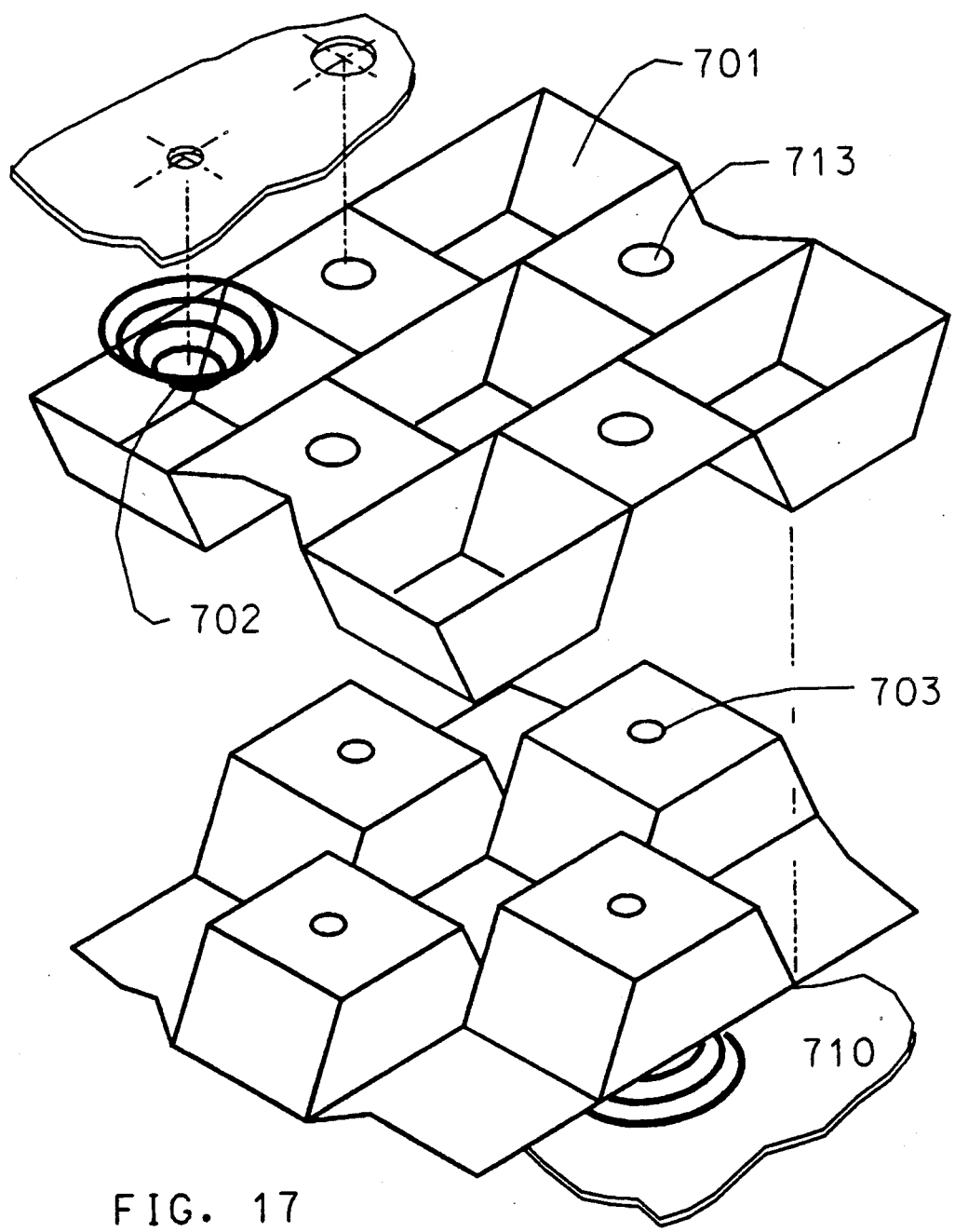
FIG. 17 illustrates a method of construction of the preferred padding according to the present invention utilizing two interleaving pieces formed partially by vacuum forming and then joined together.

A method of construction of a preferred embodiment of the padding according to the present invention is illustrated in FIG. 17. The cells 701 are wedge shaped with a rectangular cross section. The wedge portion is formed using a vacuum forming process where the wedge angle permits easy removal from the mold. After the wedge sections are formed, springs 702 can be inserted into the cells and they can be thermally joined to a flat sheet 710 completing the assembly. The dimensions of the cells are chosen so that two pieces of wedge shaped padding just fit together so that when assembled there are no voids between the cells. This results in the maximum efficiency of the padding since the entire volume between the front and back surfaces is filled with cells. The orifices 703 can be placed on either the front or back surface, or both, as desired. In either case, clearance holes 713 must be placed in the mating flat pieces.

There has thus been shown and described an improved padding for use with vehicles which fulfills all of the objects and advantages sought thereof. Many changes, modifications, variations and other uses and applications of the subject invention will, however, become apparent to those skilled in the art after considering this specification and accompanying drawings which disclose the preferred embodiments thereof. All such changes, modifications, variations and other uses and applications which do not depart from the spirit and scope of the invention are intended to be covered by the invention which is limited only by the following claims.

What is claimed is:

1. A padding for cushioning and absorbing energy from an object which impacts against it, said padding comprising a plurality of padding cells arranged substantially side by side to form a cushion surface, each padding cell including: (a) an enclosed chamber containing a gas and having side walls formed of substantially impervious flexible material and an end wall having a flow restrictor means for controlling the flow of said gas therethrough, said chamber being adapted to be collapsed from an initial position with full internal volume to a final, collapsed position with substantially less internal volume; and (b) means for restoring said chamber to its initial position, said means being disposed away from said flow restrictor means to permit the unimpeded flow of said gas to and through said flow restrictor means.

2. The padding defined in claim 1, wherein said cells have a maximum width, between opposite side walls, which is not substantially greater than the size of the object which is expected to impact against it.

3. The invention in accordance with claim 1 wherein said restoring means comprises foam.

4. The invention in accordance with claim 1 wherein said restoring means comprises fibers.

5. The invention in accordance with claim 1 wherein said restoring means comprises at least one spring.

6. The invention in accordance with claim 1 wherein said restrictor means comprises a hole in said chamber.

7. The invention in accordance with claim 1 wherein the flow through said restrictor means is substantially proportional to the viscosity of said gas.

8. The invention in accordance with claim 1 wherein means are provided to vary the area of said restrictor means in response to pressure inside said chamber.

9. The invention in accordance with claim 1 wherein the flow through said restrictor means is substantially controlled by the inertia of the gas.

10. The invention in accordance with claim 1 wherein said padding is disposed on to a motor vehicle door.

11. The invention in accordance with claim 1 wherein said padding is disposed on to a motor vehicle knee bolster.

12. The invention in accordance with claim 1 wherein said padding is disposed on to a motor vehicle headrest.

13. The invention in accordance with claim 1 wherein said padding is disposed on to a motor vehicle roof structure.

14. The invention in accordance with claim 1 wherein said padding is disposed on to a motor vehicle roof support pillar.

15. The invention in accordance with claim 1 wherein at least one chamber has restrictor means of different size than that of another chamber.

16. The invention in accordance with claim 1 wherein said padding is incorporated in a motor vehicle seat.

17. The invention in accordance with claim 16 wherein said seat additionally comprises an anti-submarining structure.

18. The invention in accordance with claim 1 wherein said gas is maintained above atmospheric pressure.

19. The invention defined in claim 1 wherein said chamber contains substantially no volume in its collapsed position.

* * * * *